United States Patent
Koenig et al.

(10) Patent No.: US 6,340,277 B1
(45) Date of Patent: Jan. 22, 2002

(54) SELF-TAPPING SCREW

(75) Inventors: Gottfried Koenig, Bad Laasphe; Werner Menz, Tambach-Dietharz, both of (DE)

(73) Assignee: EJOT Verbindungstechnik GmbH & Co KG (DE)

( * ) Notice: Subject to any disclaimer, the term of this patent is extended or adjusted under 35 U.S.C. 154(b) by 0 days.

(21) Appl. No.: 09/622,127

(22) PCT Filed: Dec. 8, 1999

(86) PCT No.: PCT/EP99/09661

§ 371 Date: Aug. 11, 2000

§ 102(e) Date: Aug. 11, 2000

(87) PCT Pub. No.: WO00/36310

PCT Pub. Date: Jun. 22, 2000

(30) Foreign Application Priority Data

Dec. 11, 1998 (DE) .......................... 198 57 311

(51) Int. Cl.[7] .......................... F16B 35/04; F16B 39/30
(52) U.S. Cl. .................. 411/416; 411/310; 411/386; 411/411
(58) Field of Search ................. 411/386, 411, 411/412, 416, 309, 310, 311

(56) References Cited

U.S. PATENT DOCUMENTS

| | | | |
|---|---|---|---|
| 3,180,202 A | * | 4/1965 | Kahn ................ 411/412 X |
| 3,377,906 A | | 4/1968 | Phipard, Jr. |
| 3,724,315 A | | 4/1973 | Sygnator |
| 3,978,760 A | | 9/1976 | Muenchinger |
| 4,430,036 A | * | 2/1984 | Chapman ................ 411/416 |
| 4,981,406 A | | 1/1991 | Weiss et al. |

* cited by examiner

*Primary Examiner*—Neill Wilson
(74) *Attorney, Agent, or Firm*—Banner & Witcoff, Ltd.

(57) ABSTRACT

Self-tapping screw having an at least partially non-round enveloping curve for the thread and having a penetrating section and a retaining section, it being the case that the penetrating section contains a plurality of successive thread stages which each have at least one thread turn and, along the thread stage, have essentially the same, aligned enveloping curve which runs either cylindrically or elliptically, the thread stages with an elliptical enveloping curve (elliptical thread stage) being combined such that the major axes of the successive elliptical thread stages, forming a stage group, are offset with respect to one another.

11 Claims, 1 Drawing Sheet

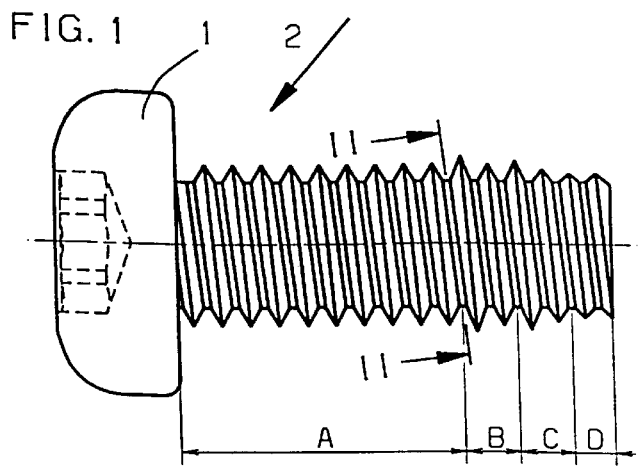
FIG. 1
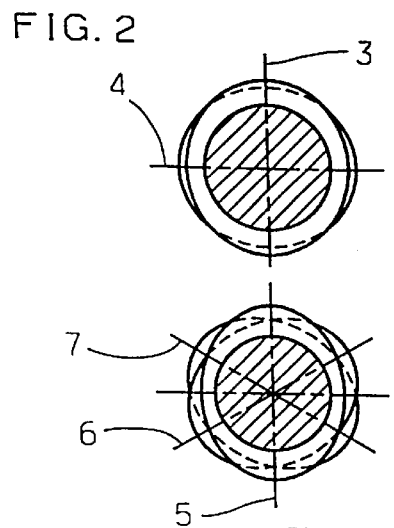
FIG. 2
FIG. 3
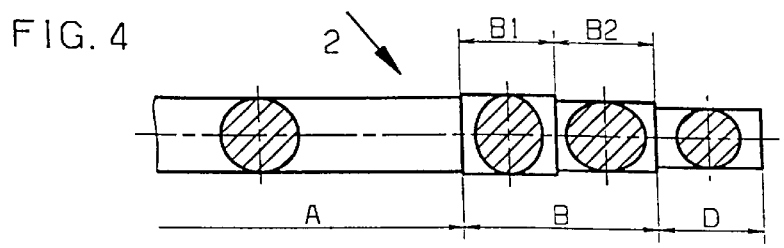
FIG. 4
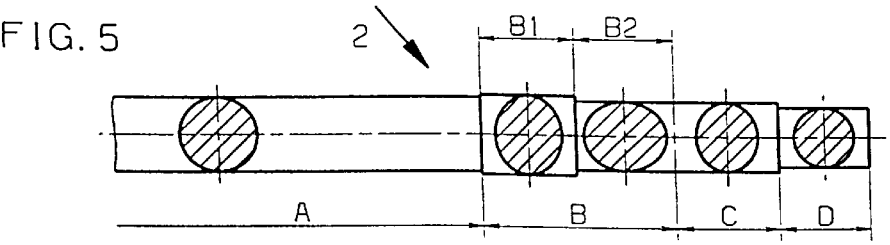
FIG. 5
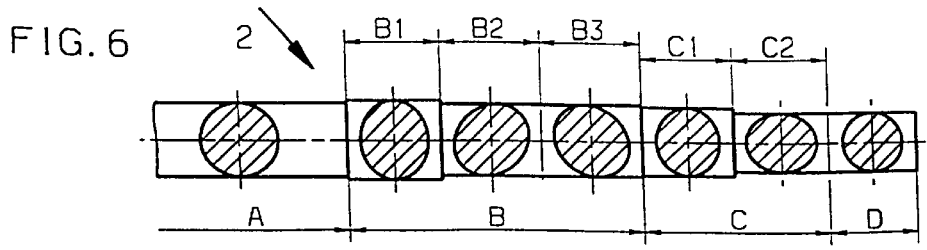
FIG. 6
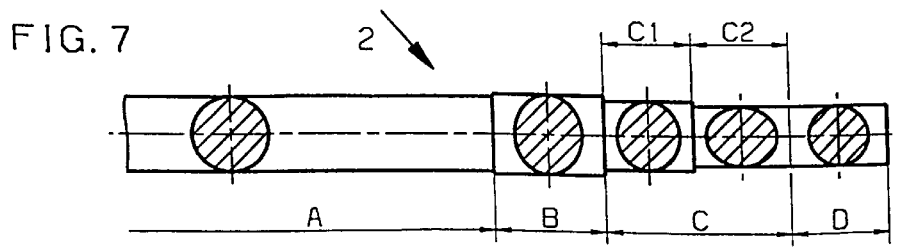
FIG. 7

SELF-TAPPING SCREW

BACKGROUND AND SUMMARY OF THE INVENTION

The invention relates to a self-tapping screw having an at least partially non-round enveloping curve for the thread, and having a penetrating section and a retaining section.

Such a screw is disclosed in European Patent 86 852. This patent described different enveloping curves for the thread of a self-tapping screw, namely, successively, in a penetrating region with a trilobular thread form with an increasing envelope diameter, an adjoining region with a likewise trilobular thread form, but with a constant envelope diameter, and finally a region with a cylindrical enveloping curve. Furthermore, the patent discloses an enveloping curve for the thread which, rather than having the trilobular thread form, has one with just two high points, which is essentially similar to an elliptical enveloping curve. In this case, the region with the cylindrical envelope forms the retaining section.

DE Patent 27 06 246 discloses a self-tapping screw which, over its entire thread length, has a cross section in the manner of an arcuate polygon. In specific terms, the figures of the patent present, for this purpose, a more or less triangular polygon (similar to the trilovular configuration according to the abovementioned European Patent 86 852). The screw according to DE Patent 27 06 246 has a penetrating section and a retaining section. In the region of the penetrating section, the polygonal configuration is more pronounced than in the retaining section, in which the curvature at the outer points of the polygon is more rounded than in the region of the penetrating section. This achieves a correspondingly low screw-in torque in the penetrating section. Furthermore, the penetrating section is configured with a smaller enveloping curve than the retaining section, in order to facilitate the screwing-in operation of the screw. Elliptical cross sections are not mentioned in said patent.

U.S. Pat. No. 3,978,760 discloses a further configuration of a thread-forming screw, in the case of which the penetrating section is of elliptical configuration and merges into a cylindrical cross section in the direction of the retaining section.

The idea of keeping the screw-in torque as low as possible by a specific configuration of the thread in the penetrating section is important in the case of the above described screws. When a self-tapping screw is screwed in, first of all the material of the relevant nut part into which the thread is to be cut resists the screw. There is also an additional torque requirement during the screwing-in operation as a result of friction of the screwed-in thread turns. There are thus numerous other documents which deal with the problem in question. The relevant prior art proposes, inter alia, to provide flattened portions on the leading thread turns in the penetrating section of self-tapping screws, with the result that the cutting of the thread and the friction produced as the screw is screwed in further are limited to those parts of the thread turns which are left. Despite these varied efforts, the task of reducing the screw-in torque while maintaining a firm fit of a self-tapping screw over its retaining section still remains a problem.

The object of the invention is thus to provide a self-tapping screw of the type specified in the introduction which ensures a low screw-in torque and has good properties as far as the firm fit of the screw in a nut part is concerned. The screw according to the invention is thus characterized in that the penetrating section contains a plurality of successive thread stages which each have at least one thread turn and, along the thread stage, have essentially the same, aligned enveloping curve which runs either cylindrically or elliptically, the thread stages with an elliptical enveloping curve (elliptical thread stage) being combined such that the major axes of the successive elliptical thread stages, forming a stage group, are offset with respect to one another.

The screw according to the invention is based on the utilization of the properties of an elliptical enveloping curve, to be precise to the effect that at least two thread stages with an elliptical enveloping curve (referred to as a stage group) follow one another such that the major axes of said elliptical thread stages are offset with respect to one another, with the result of which, as the screw is screwed in, the latter has a stable position in relation to the relevant nut part. This results from the fact that the screw, of which the thread is supported in relation to the nut part first of all via two diametrically opposite points (ends of the major axes), obtains, upon penetration of the following thread stage with an offset elliptical enveloping curve, supporting points at the ends of the major axis of the following thread stage. There are thus at least two pairs of diametrically related supporting points, the pairs being offset with respect to one another, which results in the screw which is to be screwed in being positioned in the nut part with the abovementioned stability. This has the result that, when a stage group is screwed in, the latter supports the screw against tilting in relation to the nut part, so that the screwing-in operation can take place in a largely automated manner without special centring measures.

Enveloping curve is intended to mean the progression of a lateral surface area which encloses the relevant thread stage, said lateral surface area running through the respectively radially outermost points of the thread stage. In the case of an elliptical thread stage, the enveloping curve is an ellipse. If, in contrast, the thread stage is cylindrical, then the relevant enveloping curve runs in the manner of a circle.

In the simplest case, the stage group contains two thread stages, of which the major axes are offset by 90° with respect to one another. It is also possible to include further elliptical thread stages in the stage group, in which case, from one thread stage to the next, the major axes of the latter are offset by 90° in each case.

A variant of this consists in constructing the stage group from three thread stages and in this case, from one thread stage to the next, the major axes of the latter are offset by 60° with respect to one another. It is also possible, of course, with such a configuration for further thread stages to be included in the stage group, in which case the major axis of each thread stage is offset by 60° in relation to the respectively adjacent thread stage.

According to a further variant, it is expediently possible, in the construction of the stage group from four thread stages, for the major axes of said thread stages to be offset by 45° with respect to one another in each case from one thread stage to the next. In this case too, it is, of course, possible for further thread stages, with the same offset arrangement, to be included in the relevant stage group.

Finally, the case where, in order to achieve a particularly long penetrating section, the stage group can be constructed from six thread stages, of which the major axes are offset by 30° with respect to one another from one thread stage to the next, should also be mentioned. It is also possible in this case for further, correspondingly offset thread stages to be added.

The screw can be stabilized particularly well, as it is screwed into a nut part, when the enveloping curves of the elliptical thread stages of a stage group are selected to be of the same size. In this case, the thread stages of a stage group are supported in relation to the nut part in a symmetrical and uniform manner from one thread stage to the next.

It is possible to facilitate the operation of screwing the screw into a nut part in that arranged upstream of a stage group (remote from the screw head), is an elliptical thread stage, of which the enveloping curve is smaller than the enveloping curve of the elliptical thread stage following to the rear.

The upstream elliptical thread stage with smaller enveloping curve can be used to perform something of a pre-cutting operation of the thread, which is then followed by the stage group for the definitive cutting of the thread.

It is also possible to supplement the stage group in that arranged downstream of a stage group (directed towards the screw head) is an elliptical thread stage, of which the enveloping curve is greater than the enveloping curve of the elliptical thread stage following to the front. This elliptical thread stage following the stage group is used to perform a type of calibration of the finished thread.

The screw can be centred as it is screwed in that arranged alongside an elliptical thread stage at the front end of the thread, said end being remote from the screw head, is a thread stage with a cylindrical enveloping curve (cylindrical thread stage), of which the diameter is smaller than the major axis of the enveloping curve of the elliptical thread stage.

The thread stage with a cylindrical enveloping curve and a diameter which is smaller than the major axis of the enveloping curve of the following elliptical thread stage provides guidance for the screw which is to be screwed in, since the cylindrical thread stage, as it is screwed in, is supported uniformly in relation to the nut part. Only a small number of thread turns, preferably up to four thread turns, are expediently provided for said cylindrical thread stage.

A favourable configuration for the retaining section is achieved in that arranged alongside an elliptical thread stage at the rear end of the thread, said end being directed towards the screw head, is a thread stage with a cylindrical enveloping curve (cylindrical thread stage), of which the diameter is equal to or smaller than the major axis of the enveloping curve of the elliptical thread stage. This cylindrical thread stage at the thread end which is directed towards the screw head results in the greatest possible flank overlapping for the retaining section, and thus in good adherence of the screwed-in screw in the nut part. Account should be taken here of the fact that the diameter of the cylindrical thread stage is only very slightly smaller than the major axis of the enveloping curve of the following elliptical thread stage, since this is particularly favourable for reducing the thread friction in the region of the retaining section, although, in practice, there is always still sufficient flank overlapping and thus mutual contact in the region of the retaining section.

In order for it to be possible to utilize all the effects in a favourable manner, a cylindrical thread stage is provided at the front end and at the rear end of the thread.

Only a small number of thread turns, preferably up to four thread turns, are expediently provided for the foremost elliptical thread stage, since something of a pre-cutting operation only has to be performed by this thread stage in the event of the screw being screwed into a nut part.

The screw may also be configured such that a plurality of stage groups are provided one behind the other. In this case, a plurality of stage groups one behind the other assume the essential cutting task. In this case, the enveloping curve of the stage group which penetrates first of all into a nut part is configured to be smaller than the following stage group, in order in this way for the thread which is to be cut in to be widened, as it were, in stages.

BRIEF DESCRIPTION OF THE DRAWINGS

Exemplary embodiments of the invention are illustrated in figures, in which:

FIG. 1 shows a side view of a screw having a penetrating section and a retaining section, FIG. 2 shows an illustration of an axial section of the screw along line II—II in FIG. 1 with a stage group of which the major axes are offset by 90°, FIG. 3 shows a similar sectional illustration (II—II) with major thread-stage axes offset by 60°, FIG. 4 shows a schematic illustration of the successive arrangement of a cylindrical thread stage, a following stage group and a cylindrical thread stage at the rear end of the thread, FIG. 5 shows a similar arrangement, in the case of which a single elliptical thread stage is arranged between the initial cylindrical thread stage and the stage group, FIG. 6 shows an arrangement with two successive stage groups, and FIG. 7 shows an arrangement with a stage group which has a cylindrical thread stage arranged upstream of it and an elliptical thread stage arranged downstream of it.

DETAILED DESCRIPTION OF THE PREFERRED EMBODIMENTS

An exemplary embodiment of a screw according to the invention is illustrated in a side view in FIG. 1. The screw has the screw head 1 with an adjoining thread 2. The thread 2 has a plurality of sections which will be explained with reference to FIGS. 4–7, to be precise the penetrating section D, C, B and the retaining section A. In this case, the penetrating section D, C, B is divided into a plurality of cutting zones in accordance with the depicted regions D, C and B, further details of which will be given below (FIGS. 4–7).

The thread 2 contains thread stages which each have at least one thread turn, the thread stage describing, with the vertices of its thread, an enveloping curve which, along the thread stage, is essentially constant and aligned throughout. It is possible here to provide different enveloping curves as far as their size and position are concerned, as will be explained hereinbelow with reference to the sectional drawings according to FIGS. 2 and 3. The sectional illustrations follow line II—II according to FIG. 1.

The screw according to FIG. 2 is one in which there are provided, successively, elliptical thread stages (thread stages with an elliptical enveloping curve) which follow one another in the axial direction of the screw such that the major axes of the elliptical enveloping curves are offset by 90° with respect to one another. The chain-dotted lines 3 and 4 illustrate the respective major axis in this case. The succession of the relevant elliptical thread stages in the axial direction of the screw will be explained hereinbelow with reference to FIGS. 4–7.

The sectional illustration according to FIG. 3, which likewise follows line II—II from FIG. 1, has successive elliptical thread stages which are offset by 60° with respect to one another in each case, which can be gathered from the chain-dotted lines 5, 6 and 7 illustrating the relevant major axes.

In particular in conjunction with FIGS. 2 and 3, it should be pointed out that the relevant illustrations show the extents of the enveloping curves in an exaggerated manner, this also applying to the rest of the figures in order to illustrate the screw configuration according to the invention.

In order to explain the succession of the individual thread stages and stage groups along the thread 2 of the screw according to FIG. 1, the drawing method selected for the illustration in FIGS. 4–7 is one in which, in the relevant section of the thread 2, the respective enveloping curve of the thread stage which determines the section is depicted as a sectional illustration. The cross sections as depicted in FIGS. 4–7 thus correspond, in principle, to those according to FIGS. 2 and 3.

FIG. 4 illustrates the thread 2 of the screw according to the invention with the sections A, B and D, the section D being the leading end of the screw (remote from the screw head 1 (not illustrated)). The section D is a thread stage with a cylindrical enveloping curve. The section D is adjoined by the section B, which contains the two elliptical thread stages B1 and B2. The two thread stages B1 and B2 have the same elliptical enveloping curves, but the respective major axes of the enveloping curves of the thread stages B1 and B2 are offset by 90° with respect to one another, which corresponds to the illustration in FIG. 2. The two thread stages B1 and B2 together form the stage group B. As can be seen, the diameter of the cylindrical enveloping curve of the section D is slightly smaller than the minor axis of the enveloping curve in the section B. As the screw according to FIG. 4 is screwed in, the thread is thus pre-cut in the nut part first of all by the smallest diameter in the section D, whereupon the rest of the thread is cut out by the section B2 and, finally, by the section B1. The sections B and D according to FIG. 4 form the penetrating section of the thread 2. This is adjoined by the section A as retaining section of the thread 2, in which there is a thread stage with a cylindrical enveloping curve, to be precise throughout the rest of the thread. The diameter of the enveloping curve in the section A is slightly smaller than the major axis in the section B, with the result that, once the thread 2 of the screw has been screwed in to the full extent, it is not necessary for any particularly large frictional forces to be overcome via the retaining section. In this case, as far as the staged arrangement of the major axis of the section B in relation to the diameter of the enveloping curve of section A is concerned, there is only a very slight reduction in diameter, with the result that, in the retaining section A, the relevant screw retains a firm fit.

The screw according to FIG. 5 is a modification of the screw according to FIG. 4 in so far as the section B has two sections C and D arranged upstream of it, the section D corresponding to the section D according to FIG. 4. Between the section D and the section B in FIG. 5, the section C is arranged as a thread stage with an elliptical enveloping curve, to be precise with its major axis being of a length which corresponds to the length of the minor axis in the section B. This interposition of the section C facilitates pre-cutting of the thread, which in this case takes place in three stages, namely via the sections D, C and B.

A further modification of the thread 2 is illustrated in FIG. 6. In this modification, in contrast to the screw according to FIG. 5, a section C which is formed by a stage group is provided between the sections B and C. The section C according to FIG. 5, containing a single elliptical thread stage, is replaced, in the case of the thread according to FIG. 6, by a stage group C with the elliptical thread stages C1 and C2. The enveloping curves of the two elliptical thread stages C1 and C2 are the same, but offset by 90° with respect to one another (as is also the case with the stage groups B according to FIGS. 4 and 5). Arranging the stage group C between the section D and section B achieves a further reduction in the screw-in torque for the pre-cutting of the thread in the nut part.

The stage group B illustrated in FIG. 6 contains in this case (in contrast to the stage group B according to FIG. 5) three elliptical thread stages with enveloping curves which are the same but are offset by 60° with respect to one another in each case, which corresponds to the illustration of FIG. 3. This measure also serves for reducing the screw-in torque and for stabilizing the screw as it is screwed into the nut part.

The screw according to FIG. 7 is a simplification of the screw according to FIG. 6, to be precise in so far as the section B of the screw according to FIG. 6, which has a stage group formed by three elliptical thread stages, is replaced by the single thread stage B in FIG. 7. The elliptical thread stage B, which is provided on its own in this section, has an elliptical enveloping curve, the length of the minor axis corresponding to the length of the major axis in section C. The sole thread stage B in FIG. 7 is then adjoined, as described in the case of the preceding figures, by the thread stage A as retaining section.

It should also be pointed out that it is not absolutely necessary, as illustrated in FIGS. 6 and 7, for the diameter of the cylindrical enveloping curve in the sections D to be the same as the minor axis of the enveloping curve in the sections C2. It is also possible for the diameter of the cylindrical enveloping curve in sections D to be slightly smaller. The same applies to the configuration of the screw according to FIG. 5, which shows the major axis of the enveloping curve in section C as being the same as the minor axis of the enveloping curve in the section B2. Here too, it is also possible for the major axis in the section C to be slightly smaller. It should additionally be pointed out that it is also possible for the diameter of the cylindrical enveloping curve in the section A according to FIGS. 4 to 7 to be the same as the major axis in the adjoining section B.

What is claimed is:

1. Self-tapping screw having an at least partially non-round enveloping curve for the thread and having a penetrating section and a retaining section, characterized in that the penetrating section contains a plurality of successive thread stages which each have at least one thread turn and, along the thread stage, have essentially the same, aligned enveloping curve which runs elliptically, the thread stages with an elliptical enveloping curve being combined such that the major axes of the successive elliptical thread stages, forming a stage group, are offset with respect to one another.

2. Screw according to claim 1, characterized in that the stage group contains at least two thread stages, of which the major axes are offset by the same angle with respect to one another.

3. Screw according to claim 1, characterized in that the enveloping curves of the elliptical thread stages of a stage group are the same size.

4. Screw according to claim 1, characterized in that arranged upstream of a stage group is an elliptical thread stage, of which the enveloping curve is smaller than the enveloping curve of the elliptical thread stage following to the rear.

5. Screw according to claim 1, characterized in that arranged downstream of a stage group is an elliptical thread stage, of which the enveloping curve is greater than the enveloping curve of the elliptical thread stage following to the front.

6. Screw according to claim 1, characterized in that arranged alongside an elliptical thread stage at the front end of the thread, said end being remote from the screw head, is a thread stage with a cylindrical enveloping curve, of which the diameter is smaller than the major axis of the enveloping curve of the elliptical thread stage.

7. Screw according to claim 6, characterized in that the front cylindrical thread stage only has a small number of thread turns, preferably up to 4 thread turns.

8. Screw according to claim 6, characterized in that a cylindrical thread stage is provided at the front end and at the rear end of the thread.

9. Screw according to claim 1, characterized in that arranged alongside an elliptical thread stage at the rear end of the thread, said end being directed towards the screw head, is a thread stage with a cylindrical enveloping curve, of which the diameter is equal to or smaller than the major axis of the enveloping curve of the elliptical thread stage.

10. Screw according to claim 1, characterized in that the foremost elliptical thread stage only has a small number of thread turns, preferably up to 4 thread turns.

11. Screw according to claim 1, characterized in that a plurality of stage groups are provided one behind the other, such that they increase in size in the direction of the screw head.

* * * * *